(12) United States Patent
Suzuki

(10) Patent No.: US 7,542,173 B2
(45) Date of Patent: Jun. 2, 2009

(54) IMAGE PROCESSING DEVICE AND IMAGE PROCESSING PROGRAM CAUSING COMPUTER TO EXECUTE IMAGE PROCESSING

(75) Inventor: Tetsuya Suzuki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 853 days.

(21) Appl. No.: 10/924,749

(22) Filed: Aug. 23, 2004

(65) Prior Publication Data

US 2005/0057763 A1 Mar. 17, 2005

(30) Foreign Application Priority Data

Aug. 26, 2003 (JP) ............................. 2003-301155

(51) Int. Cl.
H04N 1/40 (2006.01)
H04N 1/407 (2006.01)
H04N 1/409 (2006.01)
G06T 5/00 (2006.01)

(52) U.S. Cl. .................... 358/3.27; 358/3.24; 382/300

(58) Field of Classification Search .............. 358/1.2, 358/1.9, 3.23, 3.24, 426.01, 525, 3.21, 3.27; 382/300, 166, 246, 165; 348/581
See application file for complete search history.

(56) References Cited

U.S. PATENT DOCUMENTS

| | | | |
|---|---|---|---|
| 5,008,752 A | | 4/1991 | Van Nostrand |
| 5,327,257 A | * | 7/1994 | Hrytzak et al. .............. 358/447 |
| 5,917,947 A | * | 6/1999 | Ishida et al. ................. 382/232 |
| 6,108,105 A | | 8/2000 | Takeuchi et al. |
| 6,134,025 A | | 10/2000 | Takeuchi et al. |
| 6,157,749 A | * | 12/2000 | Miyake ....................... 382/300 |
| 6,263,120 B1 | * | 7/2001 | Matsuoka ................... 382/300 |
| 6,510,254 B1 | * | 1/2003 | Nakami et al. .............. 382/300 |
| 6,614,553 B2 | | 9/2003 | Nakami et al. |
| 6,701,010 B1 | * | 3/2004 | Katsuyama .................. 382/165 |
| 6,768,559 B1 | | 7/2004 | Kuwata et al. |
| 6,812,935 B1 | * | 11/2004 | Joe et al. ..................... 345/660 |
| 7,054,507 B1 | * | 5/2006 | Bradley et al. .............. 382/300 |
| 7,171,059 B1 | * | 1/2007 | Wang et al. ................. 382/300 |
| 2005/0237544 A1 | * | 10/2005 | Suzuki et al. ................ 358/1.2 |

(Continued)

FOREIGN PATENT DOCUMENTS

JP 01290373 A 11/1989

(Continued)

Primary Examiner—James A Thompson
(74) Attorney, Agent, or Firm—Hogan & Hartson LLP

(57) ABSTRACT

The invention is an image processing program to generate image data expanded into pixels of an image output device. The image processing procedure includes a procedure to generate second image data expanded into the pixels of the image output device by enlarging first image data expanded into pixels and contained in the rendering record, and a compression procedure that compresses the second image data. Further the generation procedure has an interpolation processing in which, when the difference in the luminance of the image data between adjacent pixels of the first image data is small, the image data of the second image data is rendered to the image data of any of the adjacent pixels, and when the difference is large, the image data of the second image data is rendered to image data that is found from the image data of the adjacent pixels by means of an interpolation calculation.

12 Claims, 10 Drawing Sheets

U.S. PATENT DOCUMENTS

2006/0056715 A1 * 3/2006 Goda et al. ............... 382/233

FOREIGN PATENT DOCUMENTS

| JP | 02185456 A | 7/1990 |
| --- | --- | --- |
| JP | 04500421 A | 1/1992 |
| JP | 07-107273 A | 4/1995 |
| JP | 08-102846 | 4/1996 |
| JP | 08-111774 A | 4/1996 |
| JP | 2000-032256 A | 1/2000 |
| JP | 2000-050067 | 2/2000 |
| JP | 3284464 | 6/2000 |
| JP | 3367555 | 1/2001 |
| JP | 3367556 | 1/2001 |
| JP | 2001-177719 | 6/2001 |
| JP | 2002152518 A | 5/2002 |

* cited by examiner

FIG. 4A
RENDERING RECORD EXAMPLE

Cir (X1, Y1, L, FILL, RGB = (128,128,128))

Image (X2, Y2, W2, H2, M, RGB, RGB, RGB............)

Character (X3, Y3, W3, H3, BM (X1, Y1, X2, Y2), RGB= (0, 0, 0 ) )

FIG. 4B
INTERMEDIATE CODE

| | |
|---|---|
| Band 1 | Cir (X1, Y1, L, FILL, RGB = (128,128,128)) |
| Band 2 | Image (X21, Y21, W2, H21, M, RGB, RGB, RGB............) |
| Band 3 | Image (X22, Y22, W2, H22, M, RGB, RGB, RGB............)<br>Character (X31, Y31, W3, H31, BM (X1, Y1, X21, Y21), RGB= (0, 0, 0 ) ) |
| Band 4 | Character (X32, Y32, W3, H32, BM (X21, Y21, X2, Y2 ), RGB= (0, 0, 0 ) ) |

IMAGE ENLARGEMENT

Small Luminance Variation

Large Luminance Variation $$\text{RGBX}(D_x, D_y) = \text{RGBX0}(X', Y')$$

$$\text{RGBX}(D_x, D_y) = f\left(\begin{array}{cccc} \text{RGBX0} & \text{RGBX1} & \text{RGBX2} & \text{RGBX3} \\ (X', Y') & (X'+1, Y') & (X', Y'+1) & (X'+1, Y'+1) \end{array}\right)$$

IMAGE PROCESSING DEVICE AND IMAGE PROCESSING PROGRAM CAUSING COMPUTER TO EXECUTE IMAGE PROCESSING

BACKGROUND OF THE INVENTION

1. Field of the Invention

The present invention relates to an image processing device and an image processing program that causes a computer to execute image processing, and, more particularly, to an image processing device and an image processing program capable of increasing the compression ratio by raising the repetition of enlarged image data that has been interpolated in an interpolation processing that enlarges a bitmap-expanded image.

2. Description of the Related Art

A printer that prints images created by a host computer is confronted by a variety of strict demands such as low costs, high-speed printing, and high quality printing. More particularly, host-based printers, for which the majority of image processing for printing is performed by the printer driver of the host computer, have been proposed due to cost-reduction demands.

In these host-based printers, a printer driver generates image data, which is expanded into RGB values for each pixel or CMYK values corresponding with the printer toner, from a rendering record that is generated by an application on the host computer, and then compresses and transfers the image data to the printer. The printer expands the received image data, performs binarization such as screen processing, and then produces an image on the print medium by means of a print engine. Because the majority of the image processing is executed by an image processing program on the host computer in line with the increase in host computer performance, the image processing device in the printer controller can be greatly reduced, which can be associated with printer cost reductions. Such a host-based printer is disclosed by Japanese Patent No. 3284464, No. 3367555, and No. 3367556.

SUMMARY OF THE INVENTION

In comparison with a conventional printer, which receives print data in page description language and performs an image processing and printing, with a host-based printer, image data expanded into pixels must be compressed on the host computer side before being transferred to the printer. Therefore, when the volume of this compressed image data increases, the time taken for the image data to be transferred from the host computer to the printer is extended, and there are therefore problems such as a drop in the printing throughput.

Furthermore, with a host-based printer, a processing for enlarging image data into pixels with a designated enlargement ratio is performed by the printer driver. In order to afford the expanded image a high picture quality, in the interpolation processing for enlargement, it is necessary to generate enlarged pixel-image data by means of an interpolation calculation from pre-enlargement pixel-image data highly accurately. However, the repetition of such image data is poor, and, according to a compression algorithm that considers the repetition of previous raster image data, previous pixel image data, and so forth, the compression ratio drops, which similarly brings about a drop in the printing throughput.

Therefore, an object of the present invention is to provide an image processing device and an image processing program that are capable of improving the compression ratio of image data that has been expanded into pixels.

In addition, an object of the present invention is to provide an image processing device and an image processing program that permit an increase in the compression ratio of the enlarged image data that has been interpolated in interpolation processing that enlarges a bitmap-expanded image.

In order to achieve the above object, an aspect of the present invention is an image processing program for causing a computer to execute an image processing procedure to generate image data expanded into pixels of an image output device from a rendering record, wherein the image processing procedure comprises: a procedure to generate second image data expanded into the pixels of the image output device by enlarging first image data expanded into pixels and contained in the rendering record; and a compression procedure that compresses the second image data; and the procedure to generate the second image data comprises an interpolation processing in which, when the difference in the luminance-related value of the image data between adjacent pixels of the first image data, which includes a plurality of pixels adjacent to position corresponding with a pixel position of the second image data, is equal to or less than a predetermined threshold value, the image data of the pixel of the second image data is rendered to the image data of any of the adjacent pixels, and when the difference exceeds the predetermined threshold value, the image data of the pixel of the second image data is rendered to image data that is found from the image data of the adjacent pixels by means of an interpolation calculation.

In order to achieve the above object, according to the another aspect of the invention, an image processing device that generates image data expanded into pixels of an image output device from a rendering record, comprising: an image generation unit which generates second image data expanded into the pixels of the image output device by enlarging first image data expanded into pixels and contained in the rendering record; and a compression unit which compresses the second image data, wherein the image generation unit comprises an interpolation processing unit that, when the difference in the luminance-related value of the image data between adjacent pixels of the first image data, which includes a plurality of pixels adjacent to position corresponding with a pixel position of the second image data, is equal to or less than a predetermined threshold value, renders the image data of the pixel of the second image data to the image data of any of the adjacent pixels, and when the difference exceeds the predetermined threshold value, renders the image data of the pixel of the second image data to image data that is found from the image data of the adjacent pixels by means of an interpolation calculation.

According to the above aspects of the invention, when the second image data is generated by enlarging the first image data, if there is a small variation in the luminance-related value between the adjacent pixels of the first data any one of image data of the adjacent pixels of the first image data that correspond with the pixel position of the second image data are rendered to the second image data, and therefore interpolation processing that permits an increase in the compression ratio of the second image data by increasing the repetition of the second image data while avoiding deterioration in the picture quality can be provided.

BRIEF DESCRIPTION OF THE DRAWINGS

FIG. 4 shows an example of a rendering record and of intermediate code;

DESCRIPTION OF THE PREFERRED EMBODIMENTS

Embodiments of the present invention will be described below with reference to the drawings. However, the scope of protection of the present invention is not limited to the following embodiments, but, instead, covers the inventions that appear in the claims as well as any equivalents thereof.

Figure 1:
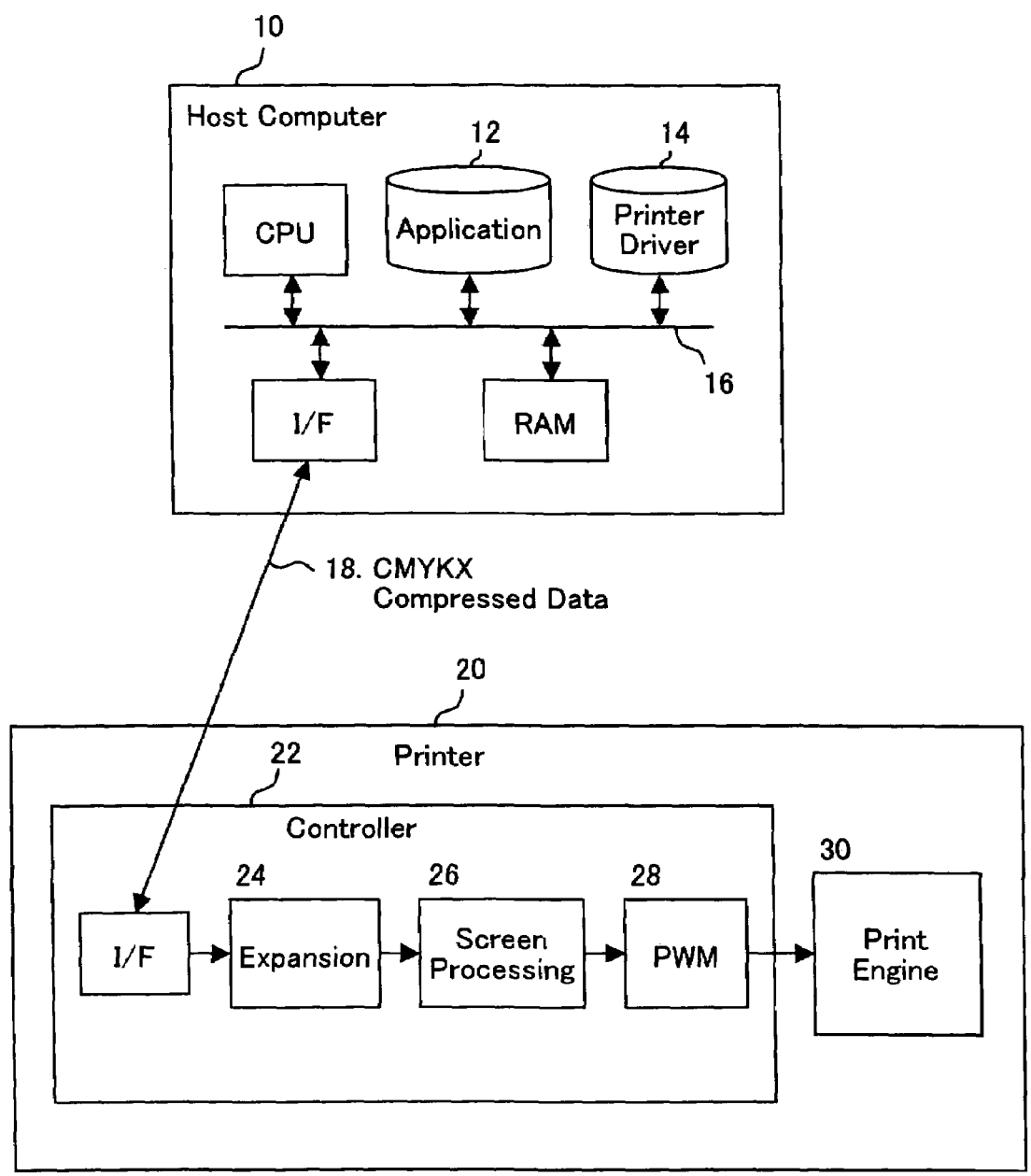
FIG. 1 shows the configuration of a host computer and printer according to the present embodiment.

FIG. 1 shows the configuration of the host computer and printer according to the present embodiment. The host computer 10 comprises a CPU, RAM, and interface means I/F, and so forth, which are connected via an internal bus 16. Furthermore, an application program 12 such as a rendering program or a word processing program for generating a rendering record, and a printer driver program 14 for generating compressed CMYK data 18 corresponding to the color material of the printer by image-processing a rendering record generated by the application program 12, are installed in a recording medium such as a HDD.

A printer 20, which is one printing device, receives compressed CMYK data 18 from the interface I/F of the host computer 10 via a predetermined communication medium. The communication medium may be a wired communication medium such as a USB cable or a wireless communication medium such as an IEEE802.11 wireless LAN or other wireless LAN. Upon receipt of the compressed CMYK image data 18, the controller 22 of the printer 20 expands the compressed image data by means of an expansion circuit 24, performs binarization for each CMYK color plane of each pixel by means of a screen processing unit 26, pulse-width modulates the binary data by means of a pulse width modulation circuit 28, and then supplies a drive pulse signal for image rendering to a print engine 30. The print engine 30 forms a latent image on a photosensitive drum by means of laser light that is driven by a drive pulse signal, for example, develops the image by means of CMYK developing toner, and then transfers the developed image to the print medium. In cases where the print engine 30 prints the image on a print medium by means of inkjets, an error diffusion processing unit and an inkjet-nozzle drive signal generation section are provided in place of the screen processing unit 26 and PWM 28, and so forth.

The printer driver 14 installed on the host computer 10 generates compressed CMYK data 18 corresponding with the printer color material by image-processing the rendering record generated by the application program 12. This image processing includes interpolation processing that generates second image data that is expanded into the pixels of the printing device by enlarging first image data that has been expanded into pixels contained in the rendering record. Further, in order to raise the compression ratio of the compressed CMYK data, processing to increase the repetition of the image data for each pixel is performed by carrying out an interpolation processing in accordance with luminance-related values such as the luminance value, brightness, and so forth, as will be described subsequently.

Figure 2:
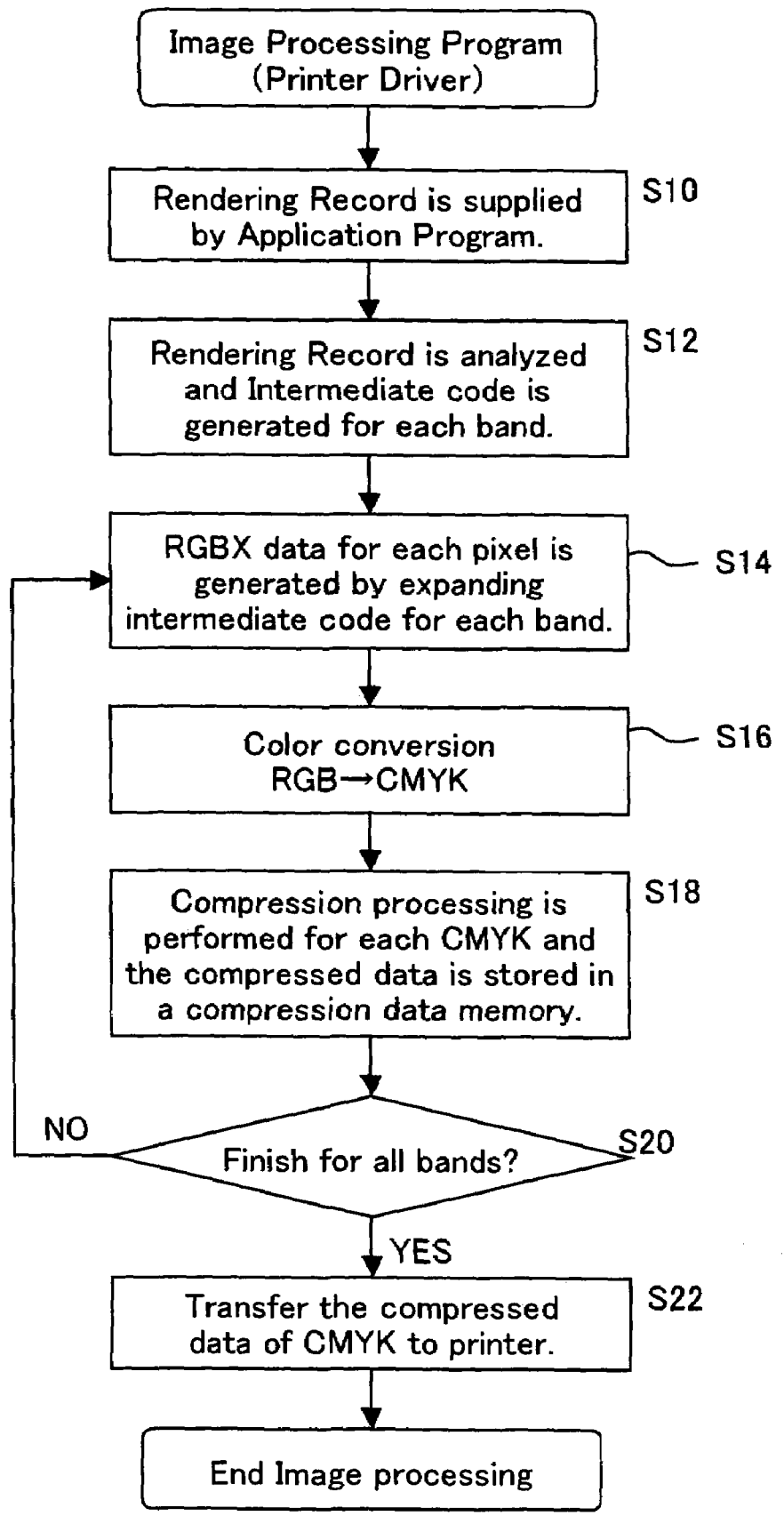
FIG. 2 is a flowchart showing the processing procedure of an image processing program that is the printer driver according to the present embodiment.

FIG. 2 is a flowchart showing the processing procedure of an image processing program that is the printer driver of this embodiment. A GDI (Graphical Device Interface)-format rendering record generated by the application program 12 is supplied to the printer driver 14 (S10).

Figure 3:
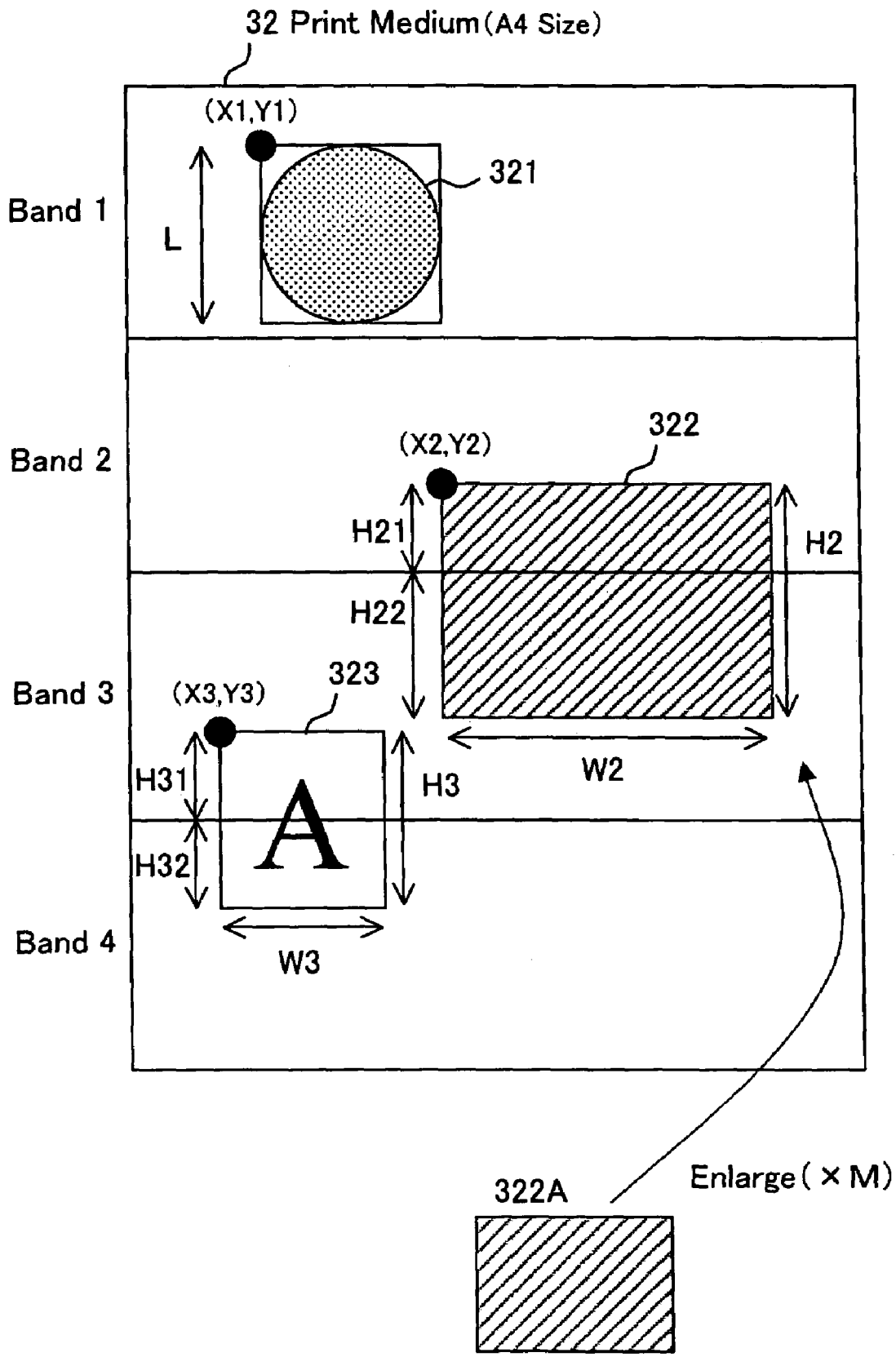
FIG. 3 shows an example of a page-resource image that is printed according to a rendering record.

Here, FIG. 3 shows an example of a page-resource image that has been printed by means of a rendering record. The image example is an example in which an image consisting of a circle 321 constituting an example of a graphic, an image 322 such as a photographic image, and a character 323 is printed on A4-size print paper (print medium) 32. An example of a rendering record that generates such a page-resource image is shown in FIG. 4A. That is, a rendering record (Cir), which fills (FILL) the inside of a circle of diameter L in a position with co-ordinates (X1, Y1) with color RGB=(128, 128, 128) is supplied for circle 321. Here, RGB data are values representing the grayscale values of the 256 grayscales of each color. In addition, a rendering record (image) that expands, by means of an enlargement coefficient M, first image data 322A representing the color RGB of each pixel, in an area of width W2 and height H2 from a position with the coordinates (X2, Y2), is supplied for the image 322. That is, an interpolation processing, which expands first image data that has already been expanded into pixel image data by means of the enlargement coefficient M, is required for the image 322. Further, a rendering record (Character), which represents the rendition, by means of the color RGB=(0, 0, 0) (black), of data with addresses (X1, Y1) to (X2, Y2) of a bitmap data file BM (not shown) in which character 'A' bitmap data is stored, in an area of width W3 and height H3 in a position with the coordinates (X3, Y3), is supplied for character 323.

Returning now to FIG. 2, when a rendering record as per FIG. 4A is supplied, the printer driver 14 analyzes the rendering record, and generates (S12) intermediate code including a function for image expansion, and so forth, for each of a plurality of bands having a predetermined number of rows, dividing the print medium. This intermediate code is one type of rendering command for the printer driver. FIG. 4B shows an example of intermediate code. For the sake of convenience, the code of the intermediate code here is the same as the code of the rendering record. As shown in FIG. 3, here, the area of the A4-sized print medium is divided into four bands.

The intermediate code in FIG. 4B contains code (rendering code) that expands the whole circle 321, which is one graphic, in band 1. That is, this code is intermediate code that expands a filled circle of diameter L in a position with the coordinates (X1, Y1) by means of color data RGB=(128, 128, 128). Further, the intermediate code contains code (a rendering command) that renders a portion of the image 322 in band 2. That is, this is intermediate code that enlarges, by enlargement coefficient M, an image with color data RGB for each pixel and expands the enlarged image in an area of width W2 and height H21 from a position with the coordinates (X21,Y21) in band 2. Furthermore, the intermediate code contains code (a rendering command) that renders the remaining portion of image 322 and a portion of character 323 in band 3. That is, this code includes intermediate code that enlarges, by enlargement coefficient M, an image with color data RGB for each pixel and expands the enlarged image in an area of width W2 and height H22 from a position with the coordinates (X22, Y22) in band 3, and intermediate code that expands, by means of color RGB=(0,0,0), bitmap data BM within an area of width W3 and height H31 from a position with the coordinates (X31, Y31) in band 3. Further, the intermediate code includes intermediate code that renders the remaining portion of the character 323 in band 4.

The intermediate code is the function code (or a rendering command) for expansion that is specific to the printer driver 14 corresponding with the printer 20, which is a printing device, and even though the rendering code of an application is different, it is possible to perform expansion into image data for each pixel by means of the common expansion procedure of the printer driver 14 by converting the rendering code into common intermediate code.

Next, the printer driver 14 performs expansion from intermediate code into image data RGBX for each pixel of the page resources of the printer in each band (S14). The image data RGBX consists of pixel color data R(red), G(green), and B(blue), and attribute data X indicating the image type, each of these image data RGBX being constituted by 8-bit data. The image types are, for example, graphics such as circles and graphs, characters, and images such as photographs and natural images, these image types being classified by attribute data X, and are utilized in the allocation of the optimal process in the screen processing of the printer controller.

Expansion Processing

By expanding the above-mentioned intermediate code, the expanded image data RGBX for each pixel is stored in the band memory region in the RAM in the host computer 10. In an initialization state, white data with RGB=(255, 255, 255) is written to the band memory as color data RGB, for example, and "graphics" is written as the type of the image of the attribute data X. Then, in band 1, pixel image data for the area in which circle 321 is rendered is generated according to the intermediate code that expands circle 321 and written to the band memory. In band 2, pixel image data in the upper part of the image 322 is written to the band memory. In addition, in band 3, pixel image data for the remaining lower portion of image 322 is written to the band memory and pixel image data for the upper part of the character 323 is written to the bend memory. Further, in band 4, pixel image data for the remaining lower part of character 323 is written to the band memory.

Interpolation Processing for Enlargement

Figure 5:
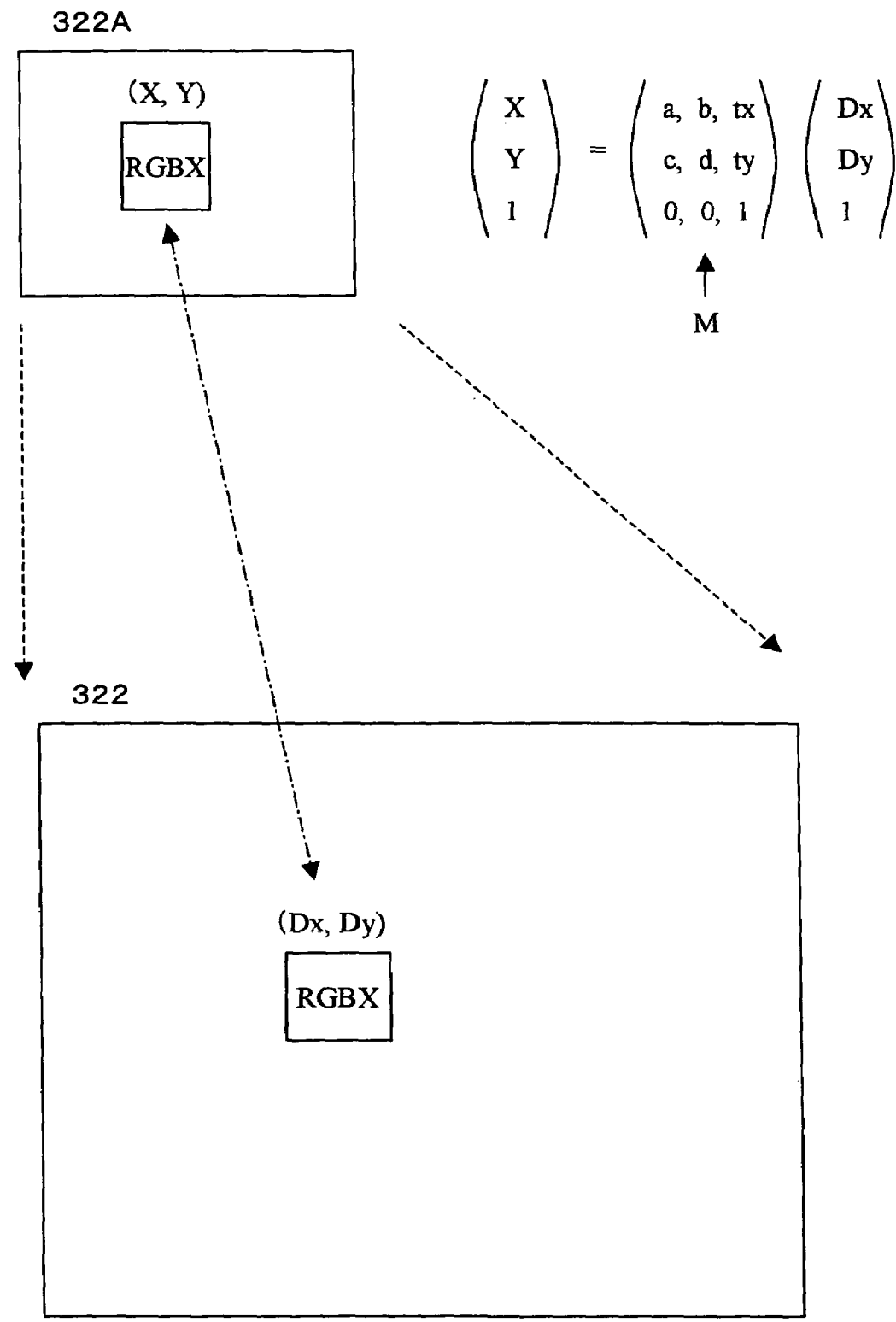
FIG. 5 serves to illustrate interpolation processing to enlarge an image.
Figure 6:
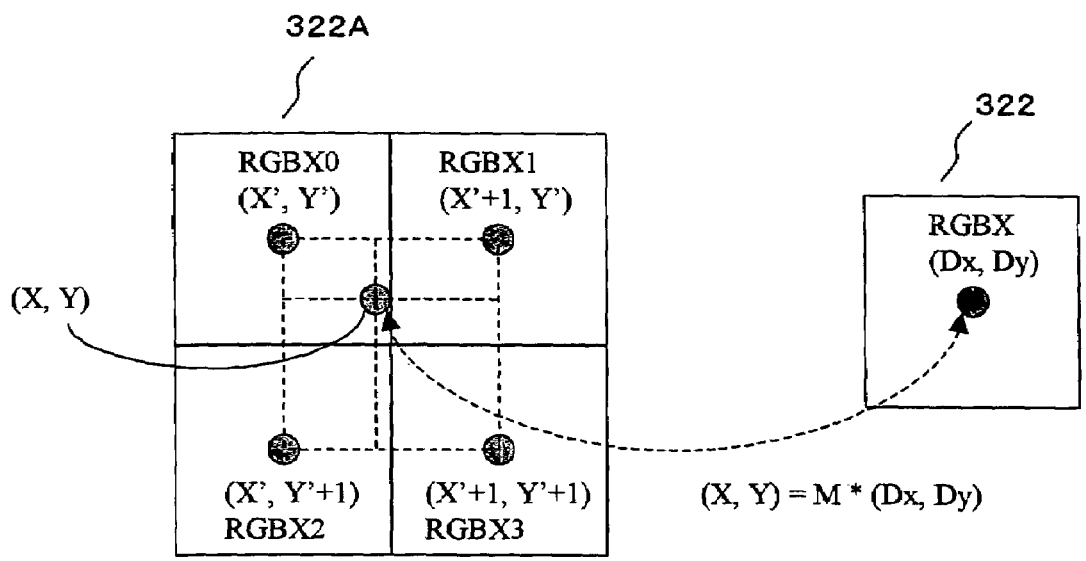
FIG. 6 serves to illustrate interpolation processing to enlarge an image.
Figure 6:
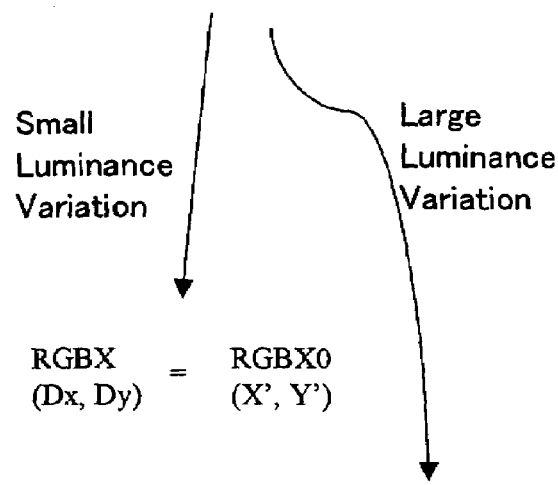

FIGS. 5 and 6 serve to illustrate interpolation processing for image enlargement. In FIG. 5, the original first image data 322A contained in the rendering record is enlarged in accordance with the enlargement coefficients M, whereby second image data 322, which is enlarged and expanded into the printer pixels, is generated. Because the number of pixels of the second image data is larger than the number of pixels of the first image data as a result of the enlargement of the image data, the second image data must be generated by interpolation from the first image data to the extent of the increased number of pixels.

In the interpolation processing for enlargement, in order to find the image data of the pixel with the coordinates (Dx, Dy) of the second image data, image data of the first image data with coordinates (X, Y), which correspond with the coordinates (Dx, Dy), is referenced. Therefore, the coordinates (X,Y) are found by means of the coordinate conversion formula shown in FIG. 5. By multiplying the enlargement coefficient matrix M by the coordinates (Dx, Dy) of the second image data, the coordinates (X,Y) of the first image data can be found. The elements a, b, c, and d of the enlargement coefficient matrix M are scale coefficients, and elements tx, ty are shift coefficients. The enlargement coefficient matrix M is a constant contained in the rendering record and also in intermediate code as mentioned earlier. The coordinates (X,Y) found by means of the coordinate conversion formula are coordinate values that include decimal places.

FIG. 6 shows the relationship between the coordinates (X, Y) and pixels of the first image data in detail. The coordinates (X,Y) that are found by coordinate-converting the coordinates (Dx, Dy) of the second image data are coordinate values that include a decimal point. As shown in FIG. 6, in the first image data 322A, the coordinate (X, Y) is located between the coordinates (X',Y') (X'+1, Y'), (X', Y'+1) (X'+1, Y'+1) (all of which are integer values) of four pixels. That is, the coordinates (X', Y') are integer values for which the decimal point of the coordinates (X,Y) is truncated or the coordinates (X,Y) are rounded off. In this case, because pixels of the first image data that correspond on a one-to-one basis with the pixels with the coordinates (Dx, Dy) of the second image data do not exist, some image data must be interpolated. Interpolation methods include the Nearest-Neighbor method and Bi-Linear method, and so forth. The Nearest-Neighbor method is a method in which the image data RGBX0 of the nearest pixel to the coordinates (X,Y) found in the coordinate conversion (pixel (X',Y') in the example of FIG. 6) is adopted without further processing for the image data with coordinates (Dx, Dy) and does not require complex computation. It is therefore possible to increase the probability of the same image data as the second image data being generated repeatedly, and the repetition of the image data therefore increases. However, the picture quality is sometimes deteriorated as a result of a drop in the plane resolution. On the other hand, the Bi-Linear method is a method that finds the image data of converted coordinates (X,Y) by subjecting the image data RGBX0 to RGBX3 of a plurality of adjacent pixels, such as the coordinates (X',Y') (X'+1, Y'), (X', Y'+1) (X'+1,Y'+1) of four pixels, for example, to a linear interpolation calculation by means of the positional relationships of the pixels (or to a higher order interpolation calculation). Despite necessitating a complex interpolation calculation, the Bi-Linear method improves the picture quality. However, with this method, when the first image data of four pixels are different, the second image data of adjacent pixels are all different, and hence the repetition of the second image data is poor.

Therefore, in this embodiment, because compression processing in which the repetition is considered at the end of the image processing by the printer driver is executed, in cases where the image data of the first image data exhibit little variation between pixels, especially the luminance variation is small, the interpolation processing is executed by means of the Nearest-Neighbor method, whereby the repetition of the second image data is increased. In cases where there is little variation in the luminance between pixels, even when image data of any of the adjacent pixels is adopted according to the Nearest-Neighbor method, the accompanying drop in picture quality can be suppressed. On the other hand, in case where the image data of the first image data exhibits a large variation in between pixels, especially the variation in the luminance is large, interpolation processing that finds the second image data according to an interpolation calculation from the first image data of a plurality of adjacent pixels such as the Bi-Linear method is performed. Although the repetition of the image data does not increase, a large drop in picture quality can thus be avoided.

In the example shown in FIG. 6, in cases where the luminance variation between adjacent pixels of the first image data 322A is small, image data RGBX0 with the coordinates (X', Y') is adopted without further processing, and, in cases where this variation is large, image data that is found from the first image data RGBX0 to RGBX3 with four sets of coordinates by means of a predetermined interpolation function f is adopted.

The interpolation calculation of the Bi-Linear method is as follows. That is, supposing that, for the sake of simplicity, the image data RGBX0 to RGBX3 with the coordinates (X',Y') (X'+1,Y1) (X', Y'+1) (X'+1,Y'+1) of four pixels are P0, P1, P2, and P3 respectively, the interpolation calculation is a linear interpolation calculation based on the distance between the coordinates (X,Y) and the coordinates (X',Y') (X'+1,Y') (X', Y'+1) (X'+1,Y'+1) of the four pixels respectively, and hence:

$$P=\{P0(X'+1-X)+P1(X-X')\}(Y'+1-Y)+\{P2(X'+1-X)+P3(X-X')\}(Y-Y').$$

Interpolation calculations other than the Bi-Linear method also include a method of finding the second image data with the coordinates (X,Y) by means of the Bicubic method from the image data of nine adjacent pixels. Further, the second image data may be found by means of a second-order interpolation calculation method instead of a first-order interpolation calculation.

Figure 7:
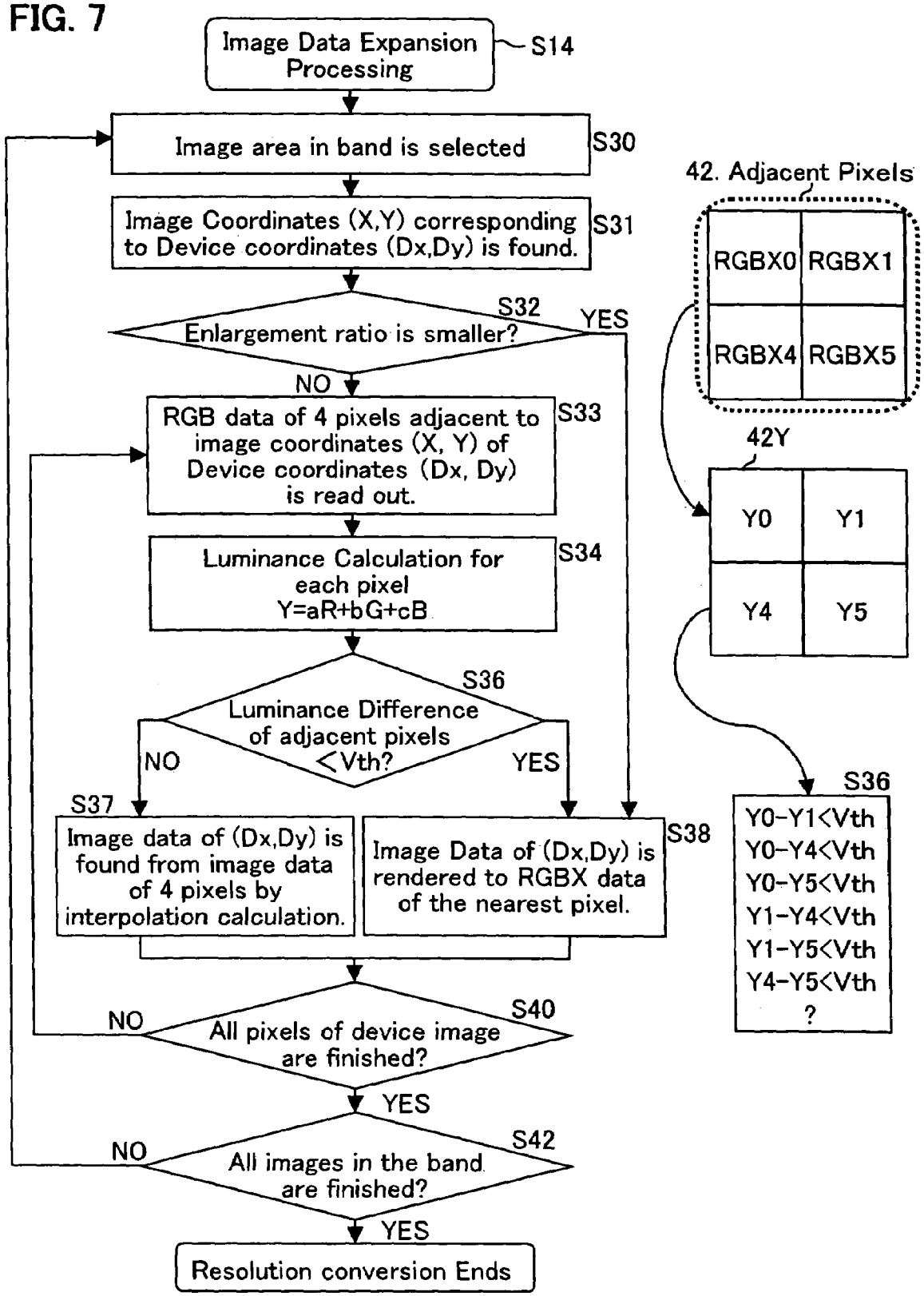
FIG. 7 is a flowchart for the image-data expansion processing that accompanies the enlargement, according to the present embodiment.

FIG. 7 is a flowchart for the image-data expansion processing that accompanies the enlargement of this embodiment. That is, FIG. 7 is a detailed flowchart of interpolation processing for enlargement in the processing S14 that expands image data for each pixel of the printing device in FIG. 2. The interpolation processing for enlargement is executed on an image and is not performed on graphics or characters, or the like. An image area in band is therefore selected (S30).

In cases where the intermediate code of the selected image is expanded into pixels, the coordinates (X,Y) of the first image data corresponding with the coordinates (Dx, Dy) of the printer are found by means of a coordinate conversion calculation (S31) as illustrated by FIGS. 5 and 6. The coordinates (Dx, Dy) are called as device coordinates (Dx, Dy) in the flowchart because (Dx, Dy) are coordinates for a device such as a printer.

Therefore, in cases where the enlargement ratio is smaller than a predetermined value (3 times, for example) (S32), because the number of pixels of the second image data to be interpolated is limited, the image data of the pixel (Dx, Dy) is found by means of the Nearest-Neighbor method (S38). In the example in FIG. 6, the image data RGBX0 of the pixel (X',Y') thus becomes the image data of the pixel (Dx, Dy) without further processing. On the other hand, when the enlargement ratio is larger than a predetermined number (S32), the method for finding the second image data to be interpolated differs depending on the amount of variation in values particularly relating to the luminance of the image data of four pixels that are adjacent to the coordinates (X,Y).

Therefore, the printer driver reads the image data RGB of four pixels that are adjacent to the coordinates (X,Y) (S33), and executes a luminance calculation for each pixel (S34). The calculation to find the luminance Y is as follows, for example.

$$Y=aR+bG+cB=0.2990*R+0.5870*G+0.1140*B$$

The arithmetic equation is a floating-point operation and, hence, in order to increase the processing speed, the following arithmetic equation, which changes coefficients by multiplying each of the coefficients a, b, and c by 65536, is preferable. All of the luminance values Y are integer values in this arithmetic equation, and hence the processing speed of the host computer can be raised.

$$Y=19595*R+38470*G+7471*B$$

A judgment of whether the difference in the luminance of adjacent pixels is equal to or less than a predetermined threshold value Vth is made for the luminance values Y of the four adjacent pixels (S36). That is, a check is made of whether the difference in the luminance value Y of these pixels is equal to or less than the threshold value Vth for a combination of six types of adjacent pixels. The threshold value Vth is set at about 64 (25%) or 128 (50%) grayscales when a maximum of 256 grayscales exist. The threshold value Vth can be suitably selected by considering the drop in picture quality. In addition, the combination of adjacent pixels is not necessarily limited to six types. There may also be only four types of adjacent pixels, which are left, right, top, and bottom respectively, or two types in an oblique direction.

Further, because the human eye is not very sensitive to image variations when the amount of variation in the luminance of adjacent pixels is smaller than the threshold value, the image data RGB0 of the pixel (X',Y') that is closest to the coordinates (X,Y) is rendered to the second image data with the device coordinates (Dx, Dy) by means of the Nearest-Neighbor method (S38). Alternatively, the image data of any of the four adjacent pixels may be given to the second image data. On the other hand, because the human eye is sensitive to image variations when the variation in the luminance of the adjacent pixels is larger than the threshold value, the image data of adjacent pixels is found by means of the interpolation calculation, i.e. the second image data with the device coordinates (Dx, Dy) is found by means of the Bi-Linear Method, for example (S37).

The above steps S33 to S38 are repeated for all the pixels in the image (S40), and steps S30 to S40 are repeated for all the images in the band (S42). As a result, all the images in the band can be expanded as the images on a printer by enlarging the images of the original image. The expanded second image data is found by means of the Nearest-Neighbor method in areas with little luminance variation, and therefore the repetition increases. On the other hand, in areas with a large luminance variation, the expanded second image data are found by means of the interpolation calculation with respect to pixel data of adjacent pixels, i.e. Bi-Linear method, whereby a drop in picture quality is avoided.

Color Conversion Processing

Returning now to FIG. 2, the second RGB image data that has been expanded into each pixel of the printer is converted to CMYK image data that corresponds with the color space of the toner used by the print engine 30 of the printer (S16). The color conversion is executed by a tetrahedral interpolation calculation that references a color conversion table created in advance. However, because the repetition, which results from providing the same image data RGBX in adjacent pixels by means of the above interpolation processing for enlargement, is high, the converted CMYK image data is given for the same image data without repeating the tetrahedral interpolation calculation of the above color conversion.

Figure 8:
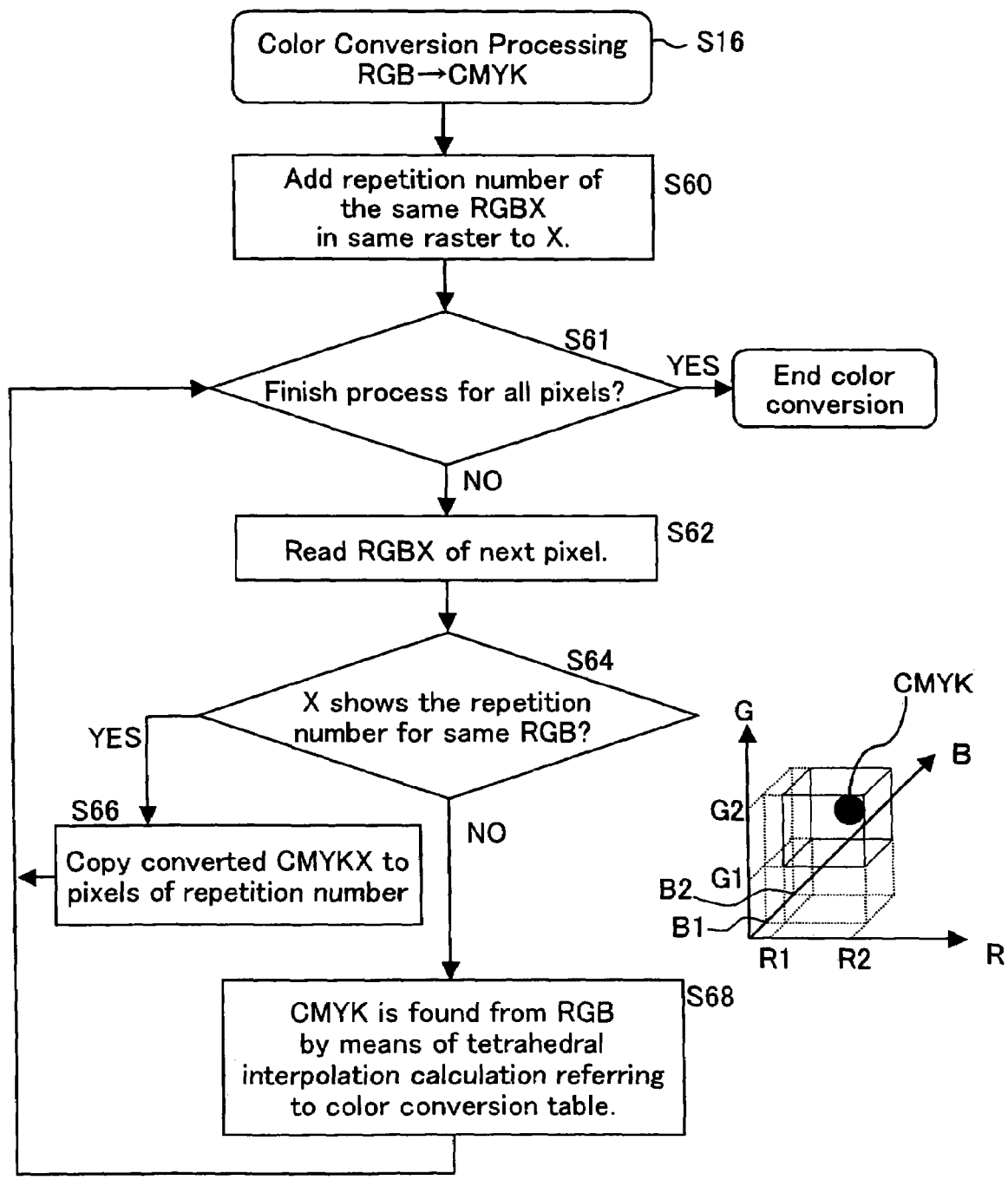
FIG. 8 is a detailed flowchart for color conversion processing S16.

FIG. 8 is a detailed flowchart for color conversion processing S16. First, the image data in the band memory are searched to find pixels in which image data RGBX are repeated in the same raster and the repetition number is added to the attribute data X of the second pixel (S60). This process is performed on all the rasters in band memory. Further, until the color conversion processing of all the pixels in band memory is complete (S61), pixel RGBX image data is read out (S62) and the required color conversion processing is performed. Initially, when the image data RGBX are repeated, the repetition number is added to the attribute data X of the second pixel in the repeated pixels. Therefore, in the color conversion processing, a check is made of whether the attribute data X of the pixel image data RGBX thus read indicates the number of repetitions of the same RGB value (S64). If the repetition number is not indicated (NO in S64), the color conversion table is referenced with respect to the RGB values thus read, and the CMYK values are found by means of the tetrahedral interpolation calculation (S68). Further, when the attribute data X indicates the repetition number (YES in S64), the already converted CMYKX values are copied as color conversion data to the pixels corresponding with the repetition number (S66). Repetition of the color conversion calculation processing can thus be omitted.

FIG. 8 shows the principles behind the tetrahedral interpolation calculation of the color conversion processing. The color conversion table already recorded on a recording medium of the host computer contains respective CMYK grayscale data for combinations of grayscale data in 3 RGB color planes. However, when the color conversion table contains CMYK data corresponding with combinations of all 256 grayscales of three RGB color planes, the data amount of the color conversion table is then 3×256 and the data volume is huge. Therefore, the color conversion table contains CMYK data for lattice points of grayscale values thinned out at a predetermined rate with respect to the three RGB color planes. Accordingly, in cases where image data RGB targeted for color conversion lies between grayscale values R1 and R2 of respective lattice points prepared for the color conversion table, or between the grayscale values G1 and G2 and grayscale values B1 and B2 thereof respectively, image data CMYK that corresponds with the image data RGB to be color-converted is then found by means of the tetrahedral interpolation calculation. Color conversion processing in accordance with this tetrahedral interpolation calculation is therefore heavy processing that takes a relatively long time. More particularly, when the calculation is performed by means of a computer program such as a printer driver, the processing time tends to be longer.

In this embodiment, in the interpolation processing for enlargement, in areas in which the variation in the luminance values is small, the first image data of pixels that are adjacent to the corresponding coordinates (X,Y) are adopted to the second image data, whereby the probability of there being repetition of the same image data increases. Therefore, image data CMYK that has already been converted are given for pixels with the same image data as pixels that have undergone color conversion processing in the same raster direction, and therefore color conversion computation is not repeated for these pixels. Accordingly, the time required for the color conversion processing step can be markedly reduced.

As shown in FIG. 8, when color conversion processing has been completed for all the pixels in band memory (S61), pixel image data in band memory are all converted to CMYKX image data. The attribute data X is the same as the attribute data X of the RGBX image data.

Compression Processing

Returning now to FIG. 2, the CMYKX image data written in band memory undergoes compression processing, with respect to each of five color planes CMYKX, and the resulting data is then written to a compressed data memory that has been secured in the RAM (S18). The compression method is performed by taking the repetition of pixel image data in band into consideration. For example, when the image data is the same as the image data of pixel in the previous raster or is the same as the image data of the previous pixel, the image data is then converted only to data indicating the repetition instead of being converted to CMYKX data (8 bits each, giving a total of 8×5=40 bits) or is converted to data indicating the repetition number. Thus, by adopting a compression method that performs compression with an emphasis on repetition, the compression ratio of image data in which repetition has increased due to the interpolation processing for enlargement according to this embodiment can be increased further.

The processing for expansion into in-band pixel image data S14, the color conversion processing S16, and the compression processing S18 are performed for each band. When the processing for all the bands is complete (YES in S20), one page's worth of compressed CMYKX data 18 is transferred to the controller 22 of the printer 20 (S22). On the printer side, as shown in FIG. 1, the controller 22 transfers laser drive pulse data to the print engine 30 after subjecting the received compressed data 18 to expansion processing and performing screen processing and pulse-width conversion. In this embodiment, the compression ratio of the CMYKX image data is high and therefore the amount of data transferred from the host computer 10 to the printer 20 is small, the transfer time is reduced, and the printing throughput increases.

Luminance-related Value

In the above embodiment, the luminance values Y are found from the RGB image data expanded into pixels and then interpolation processing for enlargement is carried out depending on whether the difference in the luminance values between adjacent pixels is equal to or less than a threshold value. This is because image areas with a small variation in luminance have slight color variations and, therefore, even though color variation in these image areas is thinned somewhat, the human eye is unable to distinguish such variations with any sensitivity. Therefore, a judgment of selecting the interpolation processing may be made by using an indicator that is inconspicuous to the human eye.

Therefore, only G (green) color data that has the largest effect on the luminance values Y among the RGB color data may be the subject of a comparison rather the luminance values Y. In this case, although there is the advantage that the calculation of luminance value Y can be omitted, there is the disadvantage that the basis for the interpolation processing is somewhat inferior. Alternatively, the brightness V of the HSV (Hue, Saturation, Value) color space is found from the RGB color space, and then interpolation processing is performed depending on whether the difference in the brightness of adjacent pixels is equal to or less than the threshold value. The brightness V is the largest grayscale value (V=MAX (R, G, B)) among the RGB grayscale values, and, therefore, the computation processing to find the brightness V can be simplified even in cases where the brightness V is taken as the reference. Further, when the image data expanded into pixels is a HSV color space, the value of the brightness V thereof can be taken as the measure for interpolation processing. Further, when the color space is a grey space (luminance space) as in the case of a black and white image, the pixel grayscale values themselves are luminance values.

FURTHER EMBODIMENT

Figure 9:
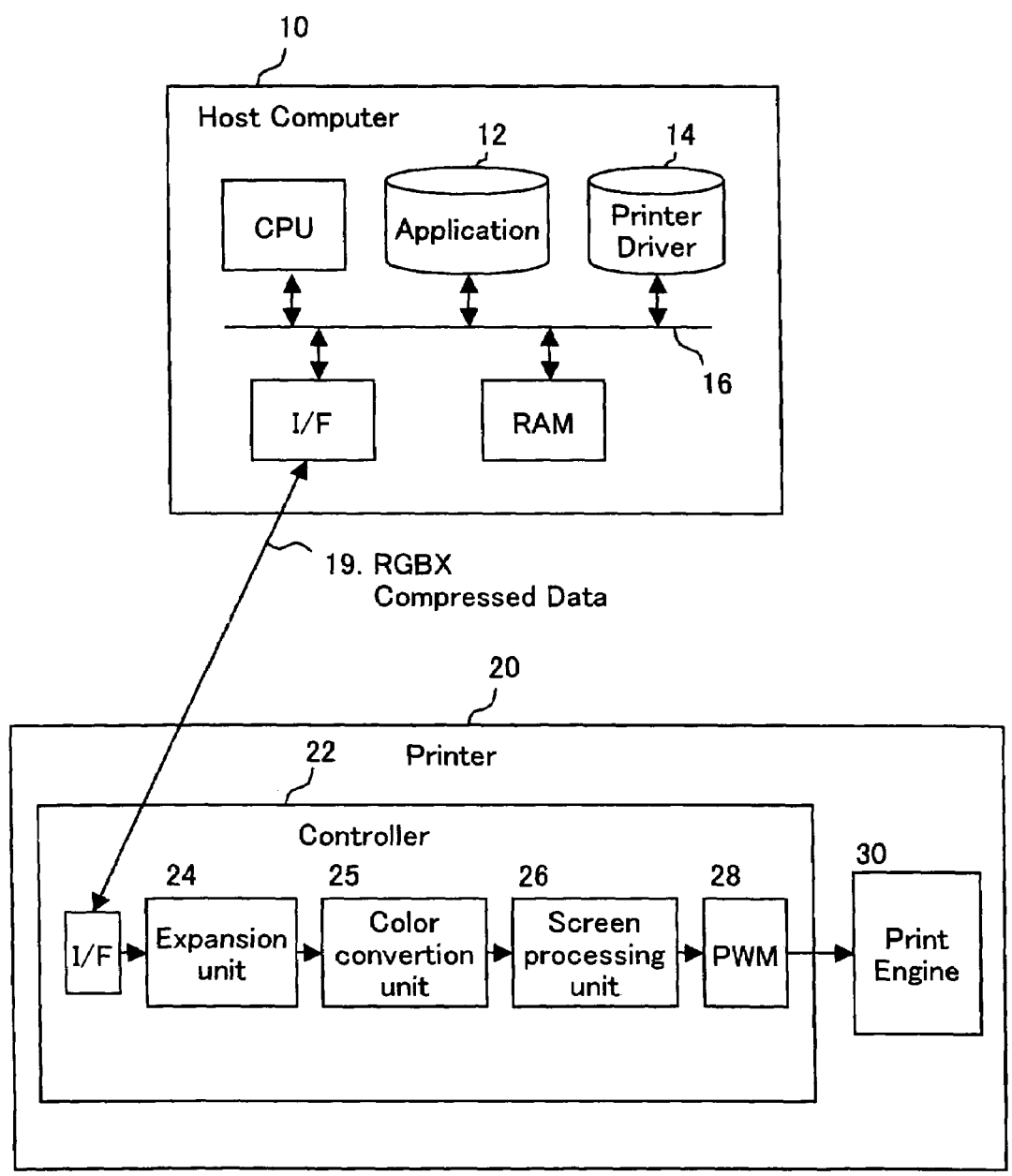
FIG. 9 shows the configuration of the host computer and printer according to another embodiment.

FIG. 9 shows the configuration of the host computer and printer according to another embodiment. In this example, a color conversion processing unit 25 is provided in the printer controller 22, compressed RGBX data 19 is transferred from the host computer 10 to the printer controller 22, and the controller 22 then performs expansion processing, color conversion processing, screen processing, and PWM processing.

Figure 10:
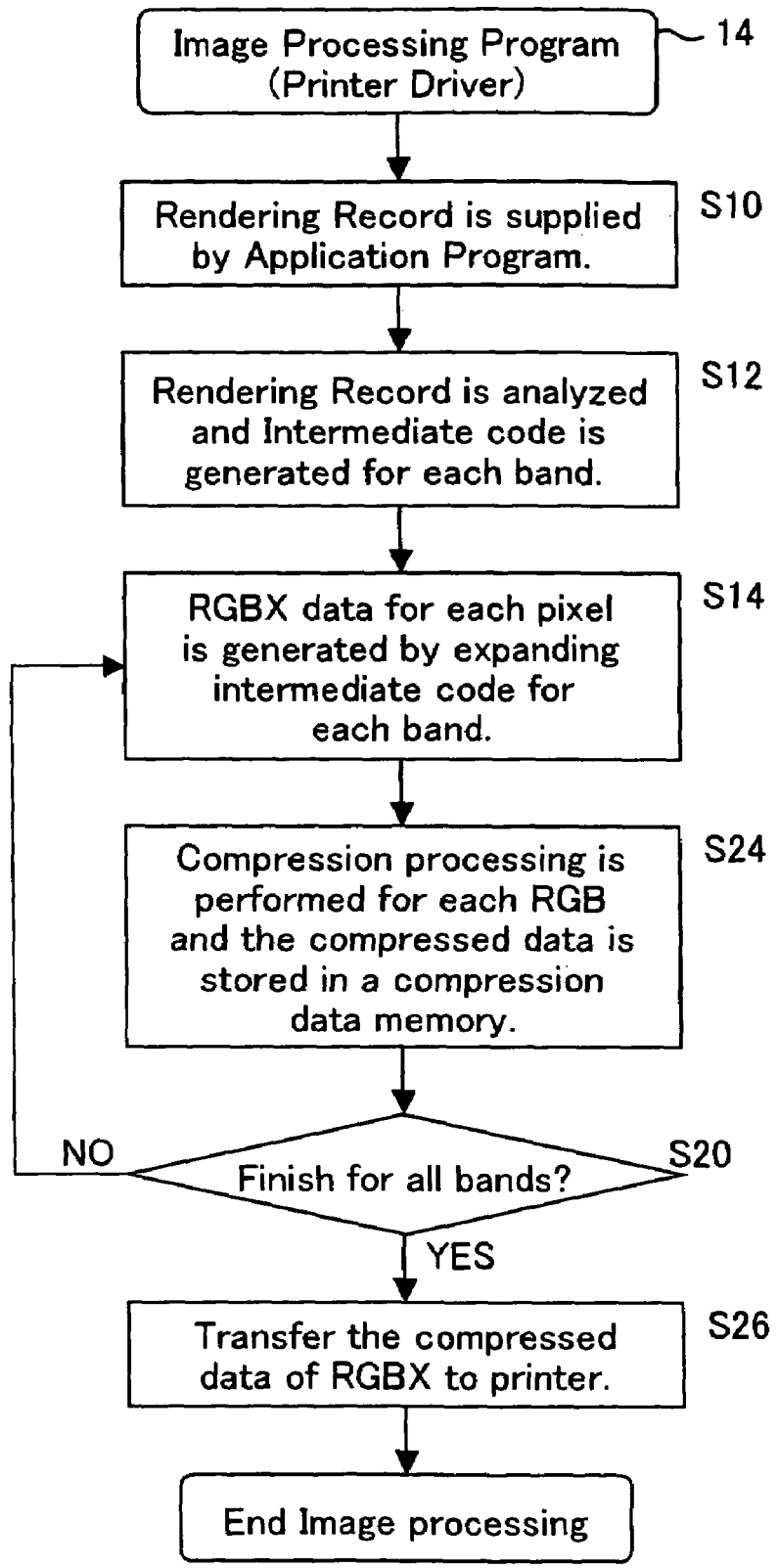
FIG. 10 is a flowchart showing the image processing procedure of a printer driver 14 according to the present embodiment.

FIG. 10 is a flowchart showing the image processing procedure of the printer driver 14 of this embodiment. The same reference numerals have been assigned to the steps that are the same as those in the flowchart in FIG. 2. Steps S10 to S16 and S20 are the same steps as those of FIG. 2. In the case of this embodiment, after the expansion processing S14 has been executed for the RGBX image data of each pixel of the printer, compression processing with an emphasis on repetition is performed on the RGBX data and the resulting compressed data is then stored in the compressed data memory (S24). Further, when the processing for all the bands is complete, compressed RGBX data in the compressed data memory is then transferred to the printer (S26). That is, in this embodiment, the printer driver 14 does not color-convert the RGBX data into CMYKX data, but instead performs compression processing on RGBX data that is rendered by resolution-conversion thinning out color data, and then transfers the compressed data to the printer. So too here, because the repetition of the RGBX data increases as a result of the resolution conversion, the compression ratio can be increased, the volume of transferred data can be reduced, and hence the transfer time can be shortened.

What is claimed is:

1. A computer readable medium storing an image processing program for causing a computer to execute an image processing procedure to generate image data expanded into pixels of an image output device from a rendering record,
wherein the image processing procedure comprises:
a procedure to generate second image data expanded into the pixels of the image output device by enlarging first image data expanded into pixels and contained in the rendering record; and
a compression procedure that compresses the second image data; and
the procedure to generate the second image data comprises an interpolation processing in which, when the difference in the luminance-related value of the image data between adjacent pixels of the first image data, which includes a plurality of pixels adjacent to position corresponding with a pixel position of the second image data, is equal to or less than a predetermined threshold value, which is greater than zero, for all combinations of the adjacent two pixels, the image data of the pixel of the second image data is rendered to the image data of any one of the adjacent pixels of the first image data; and when the difference exceeds the predetermined threshold value, the image data of the pixel of the second image data is rendered to image data that is generated from the image data of the adjacent pixels of the first image data by means of an interpolation calculation.

2. The computer readable medium storing an image processing program according to claim 1, wherein the luminance-related value is any of:
a luminance value that is produced by adding together predetermined coefficients multiplied by respective RGB grayscale values in cases where the color space of the first image data is an RGB space;
a grayscale value in cases where the color space is a gray space;
a G grayscale value in cases where the color space is an RGB space;
the largest RGB grayscale value in cases where the color space is an RGB space;
a luminance value that is produced by adding together predetermined coefficients multiplied by respective CMY grayscale values in cases where the color space is a CMY space; and
the brightness value in cases where the color space is a Hue, Saturation, Value space.

3. The computer readable medium storing an image processing program according to claim 1, wherein the interpolation calculation is an interpolation calculation that interpolates the first image data of the plurality of adjacent pixels in accordance with distance between the positions of the plurality of adjacent pixels and the position of the first image data corresponding with the pixel position of the second image data.

4. The computer readable medium storing an image processing program according to claim 1, wherein the rendering record includes at least a character rendering command, a graphic rendering command and an image rendering command; and
the interpolation processing is performed when the second image data for the image rendering command is generated.

5. The computer readable medium storing an image processing program according to claim 1, wherein the compression procedure performs compression by considering repetition of image data.

6. A computer readable medium storing an image processing program for causing a computer to execute an image processing nrocedure to generate image data expanded into pixels of an image output device from a rendering record,
wherein the image processing procedure comprises:
a procedure to generate second image data expanded into the pixels of the image output device by enlarging first image data expanded into pixels and contained in the rendering record; and
a compression nrocedure that compresses the second image data: and
the procedure to generate the second image data comprises an interpolation processing in which, when the difference in the luminance-related value of the image data between adjacent pixels of the first image data, which includes a plurality of pixels adjacent to position corresponding with a pixel position of the second image data, is equal to or less than a first predetermined threshold value, which is greater than zero, for all combinations of the adjacent two pixels, the image data of the pixel of the second image data is rendered to the image data of any one of the adjacent pixels of the first image data; and when the difference exceeds the first predetermined threshold value, the image data of the pixel of the second image data is rendered to image data that is generated from the image data of the adjacent pixels of the first image data by means of an interpolation calculation,
wherein the interpolation processing of the procedure to generate the second image data renders the image data of the pixels of the second image data to the image data of any one of the plurality of adjacent pixels of the first image data when the ratio of enlargement from the first image data to the second image data is less than a predetermined value, regardless if the difference exceeds the first predetermined threshold value or not, and
wherein the compression procedure nerforms compression by considering repetition of image data.

7. An image processing device that generates image data expanded into pixels of an image output device from a rendering record, comprising:
an image generation unit which generates second image data expanded into the pixels of the image output device by enlarging first image data expanded into pixels and contained in the rendering record; and
a compression unit which compresses the second image data,
wherein the image generation unit comprises an interpolation processing unit that, when the difference in the luminance-related value of the image data between adjacent two pixels of the first image data, which includes a plurality of pixels adjacent to position corresponding with a pixel position of the second image data, is equal to or less than a predetermined threshold value, which is greater than zero, for all combinations of the adjacent two pixels, renders the image data of the pixel of the second image data to the image data of any one of the adjacent pixels of the first image data; and when the difference exceeds the predetermined threshold value, renders the image data of the pixel of the second image data to image data that is generated from the image data of the adjacent pixels of the first image data by means of an interpolation calculation.

8. An image processing device that generates image data expanded into pixels of an image output device from a rendering record, comprising:

an image generation unit which generates second image data expanded into the pixels of the image output device by enlarging first image data expanded into pixels and contained in the rendering record; and a compression unit which compresses the second image data, wherein the image generation unit comprises an interpolation processing unit that, when the difference in the luminance-related value of the image data between adjacent pixels of the first image data, which includes a plurality of pixels adjacent to position corresponding with a pixel position of the second image data, is equal to or less than a first predetermined threshold value, which is greater than zero, for all combinations of the adjacent two pixels, renders the image data of the pixel of the second image data to the image data of any one of the adjacent pixels of the first image data: and when the difference exceeds the first predetermined threshold value, renders the image data of the pixel of the second image data to image data that is generated from the image data of the adjacent pixels of the first image data by means of an interpolation calculation, wherein the interpolation processing unit of the generation unit renders the image data of the pixels of the second image data to the image data of any of the plurality of adjacent pixels of the first image data when the ratio of enlargement from the first image data to the second image data is less than a second predetermined value, regardless if the difference exceeds the first predetermined threshold value or not, and wherein the compression procedure performs compressions by considering repetition of image data.

9. The image processing device according to claim 7, wherein the luminance-related value is any of:

a luminance value that is produced by adding together predetermined coefficients multiplied by respective RGB grayscale values in cases where the color space of the first image data is an RGB space;

a grayscale value in cases where the color space is a gray space;

a G grayscale value in cases where the color space is an RGB space;

the largest RGB grayscale value in cases where the color space is an RGB space;

a luminance value that is produced by adding together predetermined coefficients multiplied by respective CMY grayscale values in cases where the color space is a CMY space; and the brightness value in cases where the color space is a Hue, Saturation, Value space.

10. The image processing device according to claim 7, wherein the interpolation calculation is a calculation that interpolates the first image data of the plurality of adjacent pixels in accordance with distance between the positions of the plurality of adjacent pixels and the position of the first image data corresponding with the pixel position of the second image data.

11. A computer readable medium storing an image processing program for causing a computer to execute an image processing procedure to generate image data expanded into pixels of an image output device from a rendering record, wherein the image processing procedure comprises:

a procedure to generate second image data expanded into the pixels of the image output device by enlarging first image data expanded into pixels and contained in the rendering record; and a compression procedure that compresses the second image data; and the procedure to generate the second image data comprises an interpolation processing in which, when the difference in the luminance-related value of the image data between adjacent pixels of the first image data at a position corresponding with a pixel position of the second image data is equal to or less than a predetermined threshold value, which is greater than zero, for all combinations of the adjacent two pixels, the image data of the pixel of the second image data is generated by means of Nearest-Neighbor method from the image data of the adjacent pixels of the first image data; and when the difference exceeds the predetermined threshold value, the image data of the pixel of the second image data is generated by means of Bi-Linear method from the image data of the adjacent pixels of the first image data.

12. An image processing device that generates image data expanded into pixels of an image output device from a rendering record, comprising:

an image generation unit which generates second image data expanded into the pixels of the image output device by enlarging first image data expanded into pixels and contained in the rendering record; and a compression unit which compresses the second image data, wherein the image generation unit comprises an interpolation processing unit that, when the difference in the luminance-related value of the image data between adjacent pixels of the first image data at a position corresponding with a pixel position of the second image data is equal to or less than a predetermined threshold value, which is greater than zero, for all combinations of the adjacent two pixels, the image data of the pixel of the second image data is generated by means of Nearest-Neighbor method from the image data of the adjacent pixels of the first image data; and when the difference exceeds the predetermined threshold value, the image data of the pixel of the second image data is generated by means of Bi-Linear method from the image data of the adjacent pixels of the first image data.

* * * * *